United States Patent [19]

Argy

[11] Patent Number: 4,461,398
[45] Date of Patent: Jul. 24, 1984

[54] STORAGE TANK FOR CRYOGENIC LIQUEFIED GASES SUCH IN PARTICULAR AS HYDROGEN

[75] Inventor: Gilles Argy, La Queue les Yvelynes, France

[73] Assignee: Technigaz, France

[21] Appl. No.: 349,991

[22] Filed: Feb. 19, 1982

[30] Foreign Application Priority Data

Feb. 20, 1981 [FR] France .................... 81 03447

[51] Int. Cl.³ ........................................... B65D 90/04
[52] U.S. Cl. ................................ 220/422; 52/249; 52/573; 220/423; 220/424; 220/436; 220/437; 220/901
[58] Field of Search ................... 220/435–440, 220/901, 448, 420, 425, 426, 422, 423, 424; 52/573, 249; 114/74 R

[56] References Cited

U.S. PATENT DOCUMENTS

| Re. 21,618 | 11/1940 | O'Leary | 220/424 |
|---|---|---|---|
| 2,947,438 | 8/1960 | Clauson | 220/426 |
| 3,302,358 | 2/1967 | Jackson | 52/573 |
| 3,319,431 | 5/1967 | Clarke et al. | 220/426 X |
| 3,379,330 | 4/1968 | Perkins, Jr. | 220/9 |
| 3,410,443 | 11/1968 | Hofmann | 220/423 |
| 3,525,661 | 8/1970 | Jackson | 220/425 X |
| 3,760,971 | 9/1973 | Sterrett | 220/435 |
| 3,931,424 | 1/1976 | Helf et al. | 114/74 A X |
| 4,055,268 | 10/1977 | Barthel | 220/423 X |
| 4,335,831 | 6/1982 | Swaney | 220/436 X |

FOREIGN PATENT DOCUMENTS

| 12038 | 6/1980 | European Pat. Off. | 220/423 |
| 1478254 | 3/1967 | France . | |

Primary Examiner—Allan N. Shoap
Assistant Examiner—Robert Petrik
Attorney, Agent, or Firm—Steinberg & Raskin

[57] ABSTRACT

A storage tank for cryogenic liquefied gases comprising an outer shell, a fluid-tight inner shell defining the storage space containing the liquefied gas and an insulating structure provided in the evacuated intermediate space, the insulating structure including a wall made of juxtaposed hollow, evacuated panels, the joints between adjacent panels being tightly covered by elements adapted to take up the cold-induced wall shrinkage, the elements and the inner wall of said juxtaposed panels forming said inner shell.

9 Claims, 4 Drawing Figures

STORAGE TANK FOR CRYOGENIC LIQUEFIED GASES SUCH IN PARTICULAR AS HYDROGEN

The present invention relates essentially to a storage tank, vessel or container for holding low-temperature liquefied gases such in particular as liquid hydrogen, of the kind comprising an outer shell or casing, a fluid-tight inner shell of casing defining the storage space for the liquefied gas and an insulating structure fitted into the evacuated intermediate space provided between both shells.

It is known how advantageous would be the possibility of the availability of tanks capable of storing a large amount of liquefied gas, in particular liquid hydrogen. The production of liquid hydrogen indeed through electrolysis from water and its storage in a large amount in the liquid state would be an advantageous approach to the problem of storing in chemical form the excess electrical energy produced in an electronuclear power plant during off-peak hours, which energy would be lost if there were no storage possibility. Now for instance the daily energy production of an electronuclear power plant comprising three plants of 1,300 MV during off-peak hours could reach 8,000 m$^3$ of liquid hydrogen. Moreover, in order that a storage of electrical energy in chemical form could effectively be contemplated, there should be stored an amount of liquid hydrogen corresponding to several days of production, i.e. to a capacity of several tens of thousands of cubic meters.

The known tanks of the above-mentioned kind do not allow to reach storage volumes of such a magnitude. With evacuated insulated tanks, the holding capacity is limited by the mechanical behaviour of the evacuated enclosures. Moreover, a loss of fluid-tightness of the evacuated enclosure would result in a very sharp increase in the evaporation or boil-off rate and in a non-negligible risk or hazard of tank failure.

One main object of the present invention is to provide a tank of the kind set forth hereinabove which could have a very high storage capacity and which therefore may be used for instance for the storage of excess energy produced in an electronuclear power plant.

For attaining such an aim the tank according to the invention is characterized in that the insulating structure comprises a wall made of juxtaposed panels which are hollow and evacuated and in that the joints or partings between adjacent or meeting panels are covered tightly or in sealed relationship by elements adapted to take up the cold-induced shrinking or contraction of the wall, these elements and the inner surface of the wall forming together said inner fluid-tight casing or shell.

According to an advantageous characterizing feature of the invention, the space about the joints, which is covered in fluid-tight relationship by the elements or members for taking up thermal contraction is filled with an inert gas with a liquefaction point lower than that of the stored gas.

The invention will be better understood and further objects, characterizing features, details and advantages thereof will appear more clearly as the following explanatory description proceeds with reference to the accompanying diagrammatic drawings given by way of non-limiting example only illustrating a presently preferred specific embodiment of the invention and wherein.

Figure 1:
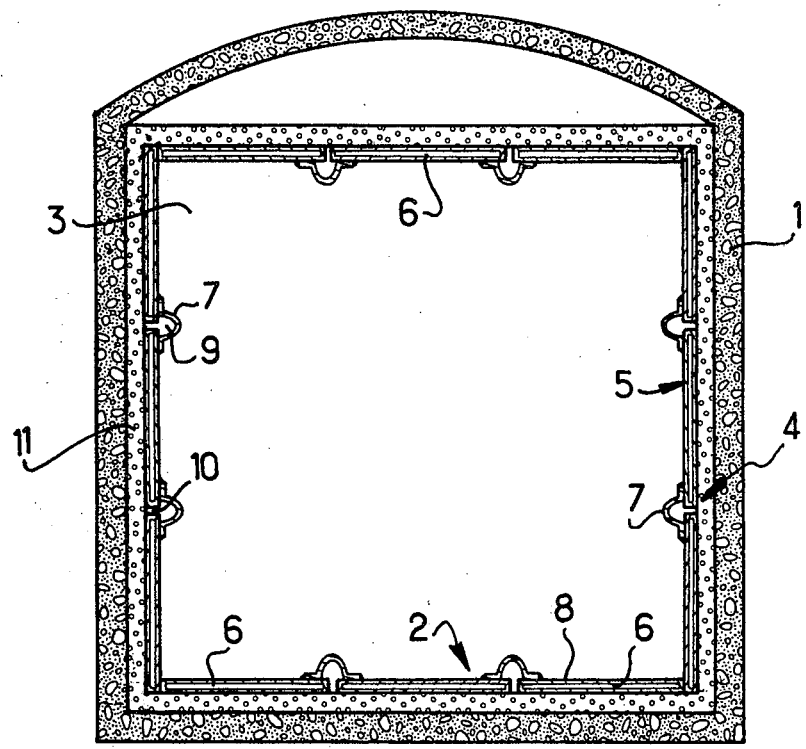
FIG. 1 is a view in axial section illustrating the principle of the construction of a tank according to the invention filled with a liquefied gas.

FIG. 1 diagrammatically shows a tank of cylindrical shape for storing a liquefied gas at a very low temperature, such in particular as liquid hydrogen at a temperature of about 20° K. i.e. −253° C. The tank comprises a self-supporting outer shell or casing 1, an inner shell or casing 2 defining the storage space or holding room 3 to be filled with liquefied gas and an insulating structure 4 provided within the intermediate space left between said shells.

According to the invention, the insulating structure 4 includes an inner wall 5 consisting of juxtaposed panels 6 which are hollow and evacuated and made for instance from stainless steel. The joints or partings between any two adjacent or meeting panels 6 are covered in fluid-tight relationship by a network of orthogonally intersecting expansion corrugations or undulations 7 and of corrugation crossings known per se. The corrugations or undulations 7 are secured to the inner sides 8 of the panels 6 as by welding. This network of undulations or corrugations 7 and the inner wall 8 of the panels form the fluid-tight inner shell 2 defining the storage space 3 for holding the liquefied gas. The network of undulations or corrugations 7 while providing for the fluid-tightness of the inner shell 2 enables this cold shell to contract or shrink without building up too high thermal stresses.

The space 9 at the joints or partings 10 of the juxtaposed or meeting panels 6, over which joints are positioned the corrugations 7 in fluid-tight relationship, is filled with an inert gas having a liquefaction point lower than that of the stored gas. If the liquefied gas is hydrogen this inert gas could be helium.

The insulating structure 4 moreover comprises an outer insulating layer 11 made from cellular material such for instance as a polyurethane foam which allows to limit until repair the heat flux which could occur upon impairing of the vacuum within a panel 6.

Heat transfer computations show that within such an insulating structure comprising a wall 5 consisting of juxtaposed panels 6, the heat transfer is governed by the jointings between the panels, such a transfer taking place along the edges of the evacuated panels. In order that the effect provided by the wall consisting of the juxtaposed panel be optimum, it has proved advantageous to increase the sizes of the evacuated panels so as to decrease the lengths of the sides while retaining dimensions consistent with an easy handling and to increase the heat impedence of the thermal bridges constituted by the joints through a widening of the joints and a decrease of their thickness.

Figure 2:
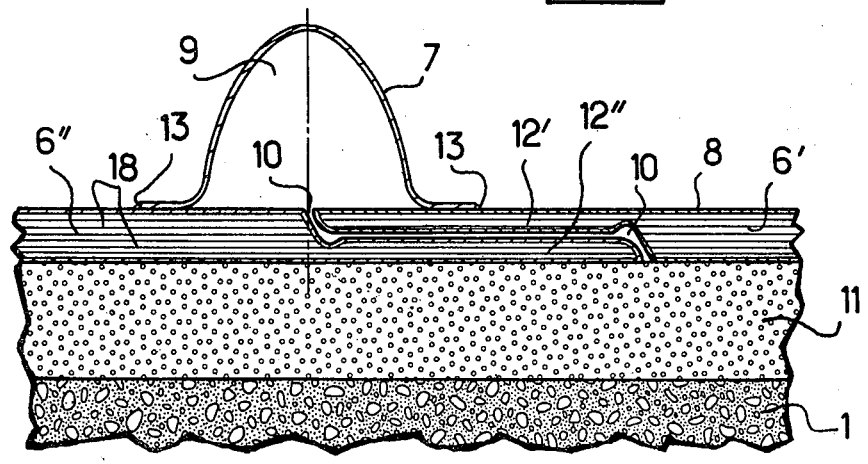
FIG. 2 is a fragmentary sectional view showing the junction area of two juxtaposed panels according to the invention.

The shape of the panels and their arrangement as shown on FIG. 2 are an advantageous approach to that problem. The Figure shows two juxtaposed panels 6', 6". Each panel comprises a peripheral edge flange 12', 12" projecting sidewise in flush aligned or registering relationship with the plane of the panel either by extending the radially inner side 8 as in the case of the panel 6' or by extending the radially outer side as in the case of panel 6". These side edge flanges have an approximately constant thickness smaller than one half of the panel thickness. For building up the wall 2, both panels 6' and 6" are juxtaposed in side-by-side positioned relationship so that their edge flanges 12' and 12" overlap each other as shown while leaving therebetween a relatively wide but narrow joint space or gap 10. Such a shape of the panels 6 at their edges makes possible a limitation of the panel thickness and provides for a resiliency of the edges upon the differential shrinking or contraction between the sides of a panel. The undulation or corrugation 7 is connected through welding at 13 to the inner side 8 of the panels in symmetrical relationship above the joint.

FIG. 2 also shows that elements 18 forming a super-insulation may be provided inside of the panels 6. Such a super-insulating material may be defined as having a thermal conductivity lower than $5 \times 10^{-3}$ mW/cm/°K. and preferably of about $3 \times 10^{-3}$ mW/cm/°K. The best presently known super-insulating material has a thermal conductivity of about $10^{-4}$ mW/cm/°K. for liquid hydrogen. This super-insulating material is known under the commercial name of MYLAR. It is made as aluminium-plated or -coated sheets as in FIG. 2 which are heat insulating on one side thereof and reflecting on the other side thereof. As a super-insulating material could also be used balls as in FIG. 3 made from metallized (for instance with Ag.Al) polystyrene.

Figure 3:
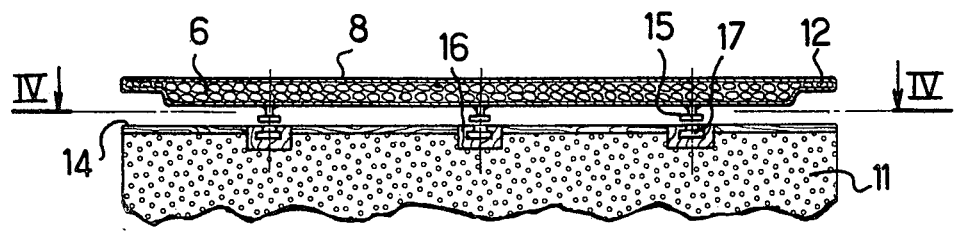
FIG. 3 is a sectional exploded view showing the fastening means for securing a panel according to the invention onto its support but showing an alternative super-insulation within the panel.
Figure 4:
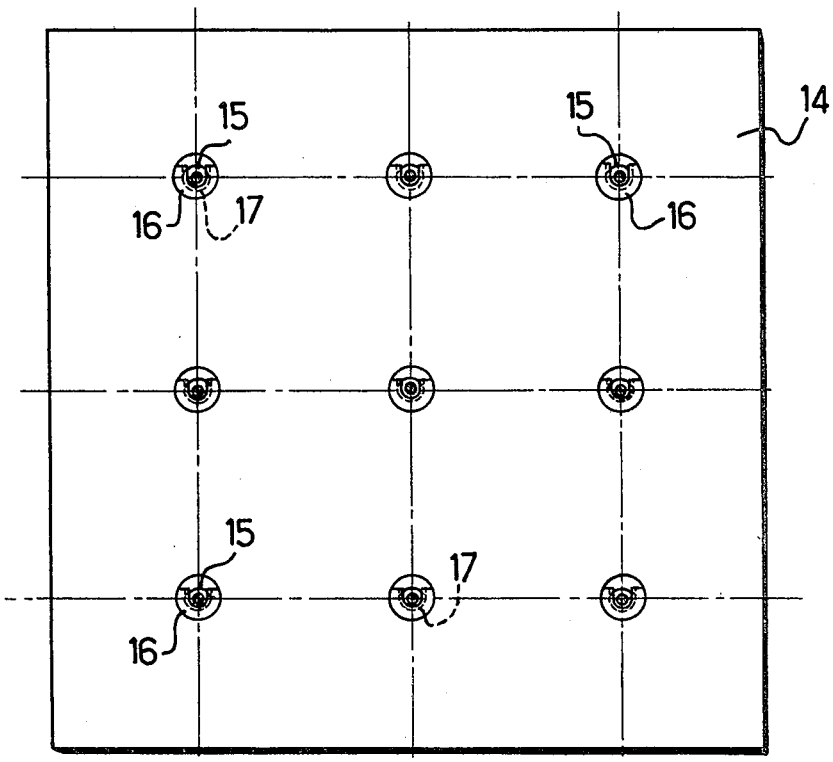
FIG. 4 is a view in section taken upon the line IV—IV of FIG. 3.

FIGS. 3 and 4 show the way a panel 6 is secured onto the outer insulating layer 11. Between the panels 6 and the layer 11 is interposed an intermediate backing or supporting plate 14 secured onto the radially inner side of the layer 11.

For connecting the panels 6 to that supporting structure consisting of the plate 14 and the layer 11, each panel 6 carries onto its radially outer side, i.e. which is in front of or opposite to the plate 14 a number of supporting foot-pieces or stud bolts 15 with enlarged bases or heads. With each supporting foot piece or stud bolt is associated a counter-member 16 with a shape complementary of or mating with the supporting foot piece or stud bolt. This counter-member 16 consists of for instance a wooden block of cylindrical shape fixedly fitted into the plate 14 and into the insulating layer 11. Within each block is machined a partly closed slide-like recess 17 for the engagement therewith of the supporting foot piece with enlarged base or head and its travel or displacement along the slideway portion into a position wherein the widened base or head of the supporting foot piece is anchored into and suspended from the plate 14.

By way of illustrative example the following most significant dimensions of an insulating structure in a tank which a heat transfer computation has shown to be particularly advantageous are given hereinafter. This computation is based upon a boil-off or evaporation rate of the liquefied gas of 0.2% per day for a tank with a given storage capacity greater than 43,500 m³, the tank having a height-to-diameter ratio of 0.7. Under such circumstances, it is advantageous to give the panels a square shape of 3.4 m by 3.4 m, with a height of 20 cm and a metal wall thickness of 0.8 mm. The outer insulating layer 11 made from insulating polyurethane foam could have a thickness of 30 cm. The peripheral edge flange could be such as providing a joint or parting gap with a width of 20 cm. In that example the panels contain or enclose as super-insulating materials composite elements consisting of an alternate super-position of several thin reflecting aluminium sheets (about 10μ thick) and of two layers of an intermediate insulating material made from a glass fiber fabric or mat.

It will be easily appreciated that the tank according to the invention offers very great advantages. For instance, owing to the division of the wall 2 into evacuated panels 6, any leakage occurring on one panel will result in a smaller loss than in the case of one single intermediate evacuated space surrounding the storage space. If the vacuum in a panel is impairing, the outer layer of the insulation 11 could restrict until the repair may take place, the heat flux which would result therefrom.

It should also be pointed out that the invention is not restricted to a storage tank provided with a self-supporting outer shell. The invention is also usable for the building of for instance storage tanks on tanker ships for carrying cryogenic liquefied gases such as liquid hydrogen.

It should be understood that the invention is not at all limited to the embodiment described and shown herein which has been given by way of illustrative example only. In particular it comprises all the means constituting technical equivalents of the means described as well as their combinations if same are carried out according to its gist and used within the scope of protection as claimed.

What is claimed is:

1. A storage tank for cryogenic liquefied gases such as, in particular, liquid hydrogen, comprising an outer shell, an inner fluid-tight shell defining a storage space containing said liquefied gas and an insulating structure provided in the intermediate space left therebetween and evacuated, said inner shell being defined by juxtaposed hollow and evacuated panels meeting along joints, and by shrinkage take up elements covering in fluid-tight relationship said joints between said adjacent panels, wherein the improvement consists in that said panels have a generally parallelepipedic shape formed with a peripheral edge flange lying in the plane of the panel in extension of a flat side thereof and having a thickness less than one half of the panel thickness, any two adjacent panels being juxtaposed in overlapping relationship of their peripheral edge flanges thereby forming a relatively wide and narrow joint gap, each panel being secured to anchoring members provided on an outer insulating layer and carrying on its side in front of said outer insulating layer a plurality of supporting foot pieces with enlarged bases adapted to be inserted and anchored into said anchoring members formed with recesses of a shape complementary of that of the enlarged bases of said supporting foot pieces for anchoring same.

2. A tank according to claim 1, wherein said hollow evacuated panels contain a super-insulating material having a thermal conductivity lower than $5 \times 10^{-3}$ mW/cm/°K.

3. A tank according to claim 2, wherein said super-insulating material is made from sheets or foils made from a material known under the trademark MYLAR, which are aluminium-plated or -coated and insulating on one side thereof and reflecting on the other side thereof.

4. A tank according to claim 2, wherein said super-insulating material consists of balls made from metallized polystyrene.

5. A tank according to claim 1, wherein said evacuated panels are made from a material having a thermal conductivity at most equal to that of stainless steel.

6. A storage tank for cryogenic liquefied gases such in particular as liquid hydrogen, comprising an outer shell, an inner fluid-tight shell defining a storage space containing said liquefied gases and an insulating structure provided in the intermediate space left therebetween and evacuated, said inner shell being defined by juxtaposed hollow and evacuated panels meeting along joints, and by shrinkage take-up elements covering in fluid-tight relationship said joints between said adjacent panels to take up the cold-induced wall shrinking, wherein the improvement consists in that said panels have a generally parallelepipedic shape formed with a peripheral edge flange lying in the plane of the panel in extension of a flat side thereof and having a thickness less than one half of the panel thickness, any two adjacent panels being juxtaposed in overlapping relationship of their peripheral edge flanges thereby forming a relatively wide and narrow joint gap, each panel being secured to anchoring members provided on an outer insulating layer and carrying on its side in front of said outer insulating layer a plurality of supporting foot pieces with enlarged bases adapted to be inserted and anchored into said anchoring members formed with recesses of a shape complementary of that of the enlarged bases of said supporting foot pieces for anchoring same, said shrinkage take-up elements are shaped as expansion corrugations and are secured in fluid-tight relationship onto the radially inner sides of said justaposed panels.

7. A tank according to claim 6, wherein the space provided at said joints covered in fluid-tight relationship by said shrinkage take-up elements is filled with an inert gas having a liquefaction point lower than that of the stored gas.

8. A tank according to claim 7, wherein said inert gas is helium when the stored gas is liquid hydrogen.

9. A storage tank for a cryogenic liquefied gas comprising an outer shell, an inner fluid-tight shell defining a storage space containing said liquefied gas and an insulating structure provided in the intermediate space left therebetween and evacuated, said inner shell consisting of juxtaposed hollow and evacuated panels meeting along joints, and of shrinkage take-up elements covering in fluid-tight relationship said joints between adjacent panels and being on the radially inner side of said panels, wherein the improvement consists in that said panels have a generally parallelepipedic shape formed with a peripheral edge flange lying in the plane of the panel in extension of a flat side thereof and having a thickness less than one half of the panel thickness, any two adjacent panels being juxtaposed in overlapping relationship of their peripheral edge flanges thereby forming a relatively wide and narrow joint gap, each panel being individually secured onto said insulating structure and said shrinkage take-up elements are shaped as expansion corrugations having two laterally spaced ends which latter are secured in fluid-tight relationship onto the radially inner sides of two adjacent panels so that one element end is secured onto the radially inner side of one of said adjacent panels while the other element end is secured to the radially inner side of the other of said two adjacent panels.

* * * * *